(12) United States Patent
Bratina

(10) Patent No.: US 7,413,590 B2
(45) Date of Patent: *Aug. 19, 2008

(54) USE OF AN INDUCTION FURNACE FOR THE PRODUCTION OF IRON FROM ORE

(75) Inventor: James E. Bratina, Greenwood, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/329,846

(22) Filed: Jan. 11, 2006

(65) Prior Publication Data

US 2007/0157761 A1 Jul. 12, 2007

(51) Int. Cl.
*C21B 13/12* (2006.01)
(52) U.S. Cl. .................... 75/10.15; 75/582
(58) Field of Classification Search ........... 75/10.15
See application file for complete search history.

(56) References Cited

U.S. PATENT DOCUMENTS

| | | | |
|---|---|---|---|
| 2,499,541 A * | 3/1950 | Tama | 373/143 |
| 2,531,964 A | 11/1950 | Bean | |
| 2,729,556 A * | 1/1956 | Fontana | 75/10.15 |
| 3,770,416 A | 11/1973 | Goksel | |
| 3,908,072 A * | 9/1975 | Collin | 75/10.15 |
| 4,082,544 A * | 4/1978 | Fredrikson | 75/10.17 |
| 4,464,197 A * | 8/1984 | Calderon | 75/10.15 |
| 4,486,889 A * | 12/1984 | Hegewaldt et al. | 373/142 |
| 4,612,041 A | 9/1986 | Matsuoka et al. | |
| 4,673,431 A | 6/1987 | Bricmont | |
| 4,675,048 A | 6/1987 | Maillet | |
| 4,762,554 A | 8/1988 | Lazcano-Navarro | |
| 4,802,919 A | 2/1989 | Fey | |
| 4,917,723 A | 4/1990 | Coy, Jr. | |
| 5,013,532 A | 5/1991 | Sresty | |
| 5,139,567 A | 8/1992 | Matsuoka et al. | |
| 5,279,643 A | 1/1994 | Kaneko et al. | |
| 5,364,441 A | 11/1994 | Worner | |
| 5,411,570 A * | 5/1995 | Fourie | 75/10.15 |
| 5,474,592 A | 12/1995 | Bresser et al. | |
| 5,538,532 A | 7/1996 | Keegel, Jr. | |
| 5,540,751 A | 7/1996 | Yamamoto et al. | |
| 5,567,225 A | 10/1996 | Bernard et al. | |
| 6,083,294 A | 7/2000 | Hara et al. | |
| 6,102,982 A | 8/2000 | Isozaki et al. | |
| 6,136,059 A | 10/2000 | Zoppi | |
| 6,221,124 B1 | 4/2001 | Blom | |
| 6,395,060 B1 | 5/2002 | Horne et al. | |
| 6,438,154 B2 | 8/2002 | Vallomy | |
| 6,464,753 B2 | 10/2002 | Horne et al. | |
| 6,562,096 B1 | 5/2003 | Price et al. | |
| 6,562,101 B1 | 5/2003 | Price et al. | |
| 6,831,939 B2 | 12/2004 | Bratina et al. | |
| 6,932,853 B2 | 8/2005 | Bratina et al. | |
| 2005/0083988 A1 | 4/2005 | Schaefer | |
| 2005/0247162 A1 | 11/2005 | Bratina | |
| 2007/0062330 A1* | 3/2007 | Bratina et al. | 75/10.14 |

* cited by examiner

*Primary Examiner*—Roy King
*Assistant Examiner*—Tima M McGuthry-Banks
(74) *Attorney, Agent, or Firm*—Butzel Long

(57) ABSTRACT

A method of using an induction furnace to process iron ore into an iron product such as pig iron in which iron ore is the main or exclusive source of iron fed into the induction furnace.

20 Claims, 3 Drawing Sheets

US 7,413,590 B2
USE OF AN INDUCTION FURNACE FOR THE PRODUCTION OF IRON FROM ORE

TECHNICAL FIELD

The present invention relates to induction furnaces and more particularly to the use of induction furnaces to produce an iron product from iron ore.

BACKGROUND ART

Traditional integrated steel making processes use ore containing iron oxide ("iron ore") as feed materials for blast furnaces. The ore is fed into blast furnaces together with a reductant material such as coke and is converted in the blast furnaces into molten iron that is then used in other steel making processes, such as in basic oxygen furnaces to produce various grades of steel.

Iron ore is generally mined and concentrated prior to shipping for use in blast furnaces located at steel mills. The concentration process increases the amount of iron up to about 60 to 65 percent by weight. Since the iron in the iron ore is in the form of iron oxide ($Fe_2O_3$), the maximum concentration of iron in pure iron oxide would be 70 percent by weight. The concentrated iron ore will generally have about 1 to 15 percent by weight of inert materials such as aluminum oxide, calcium oxide, silica oxide, magnesium oxide and manganese oxide.

Several processes have been evaluated to make either pig iron or reduced iron products at the source of the ore in efforts to reduce the cost of shipping the iron units to steel mills and foundries that use the iron to make steel and iron products. One approach involves making small or "mini-blast furnaces" at the ore mining location and using the blast furnaces to make pig iron. This approach is currently being done in Brazil in a process that uses wood as the carbon source for the operation of the blast furnaces.

Another approach that is referred to as the ITmk3 Process involves the use of ore combined with a carbon material in a rotary hearth furnace. This process is designed to produce nuggets of iron for direct use in iron and steel facilities.

There are also a number of direct reduced iron processes (DRI) that use methane, coal and other fuels to reduce iron oxides to iron at the source of the ore. The DRI materials are then shipped to iron and steel facilities.

There are economic and operational issues associated with the above-discussed iron production processes which limit their use in the world market. Nevertheless, the basic advantage that can be achieved with making iron at the location of the mine is the prospect of reducing the shipping costs that is associated with the 35 to 40 percent excess weight (non-iron content) of the ore. Another advantage is that the market for pig iron is larger than the market for iron ore, since iron ore is only sold to steel mills with blast furnaces.

U.S. Pat. No. 6,831,939 to Bratina (the present inventor) discloses the use of an induction furnace that is used for processing iron and volatile metal materials to produce hot metal or pig iron while recovering volatile metals. As disclosed, this process was designed and developed for the recovery of valuable components of materials that had previously been classified as waste materials. The process represented by this patent is a continuous process that uses waste feed materials that are a mix of metal oxides and metal halides and a reductant (such as carbon) that produces both iron and volatile metal products, with the volatile metal products being of primary interest.

U.S. Pat. No. 6,136,059 to Zoppi discloses the use of an induction furnace for the sole purpose of processing electric arc furnace (EAF) dust. That is, after Zoppi initially provides a "heel" in the induction furnace that is a half charge of cast iron which is not replenished and is used for the required oxidation and reduction reactions, are pellets of EAF dust that are added together with coal and small amounts of slagging agents. Zoppi mentions that induction furnace of the prior art are generally only used as a smelting means in secondary steel and non-ferrous metals processing.

The present invention provides a method for the production of an iron product from ore containing iron which involves the use of an induction furnace.

DISCLOSURE OF THE INVENTION

According to various features, characteristics and embodiments of the present invention which will become apparent as the description thereof proceeds, the present invention provides a process for producing an iron containing product from iron ore which involves:

providing an induction furnace;

feeding iron ore into the induction furnace with a reductant material;

melting the iron ore in the induction furnace to produce an iron liquid metal bath and a slag layer on top of the iron liquid metal bath; and recovering the iron liquid metal bath as an iron containing product.

The present invention further provides a process for producing an iron containing product from iron ore which involves:

providing an induction furnace;

feeding a single source of iron into the induction furnace with a reductant material to produce an iron containing product, the single source of iron consisting essentially of iron ore;

melting the iron ore in the induction furnace to produce an iron liquid metal bath and a slag layer on top of the iron liquid metal bath; and recovering the iron liquid metal bath as an iron containing product.

The present invention further provides a process for producing an iron containing product exclusively from iron ore which comprises:

providing an induction furnace;

exclusively feeding iron ore into the induction furnace with a reductant material to produce an iron containing product;

melting the iron ore in the induction furnace to produce an iron liquid metal bath and a slag layer on top of the iron liquid metal bath; and recovering the iron liquid metal bath as an iron containing product.

BRIEF DESCRIPTION OF DRAWINGS

The present invention will be described with reference to the attached drawings which are given as non-limiting examples only, in which.

BEST MODE FOR CARRYING OUT THE INVENTION

Figure 1:
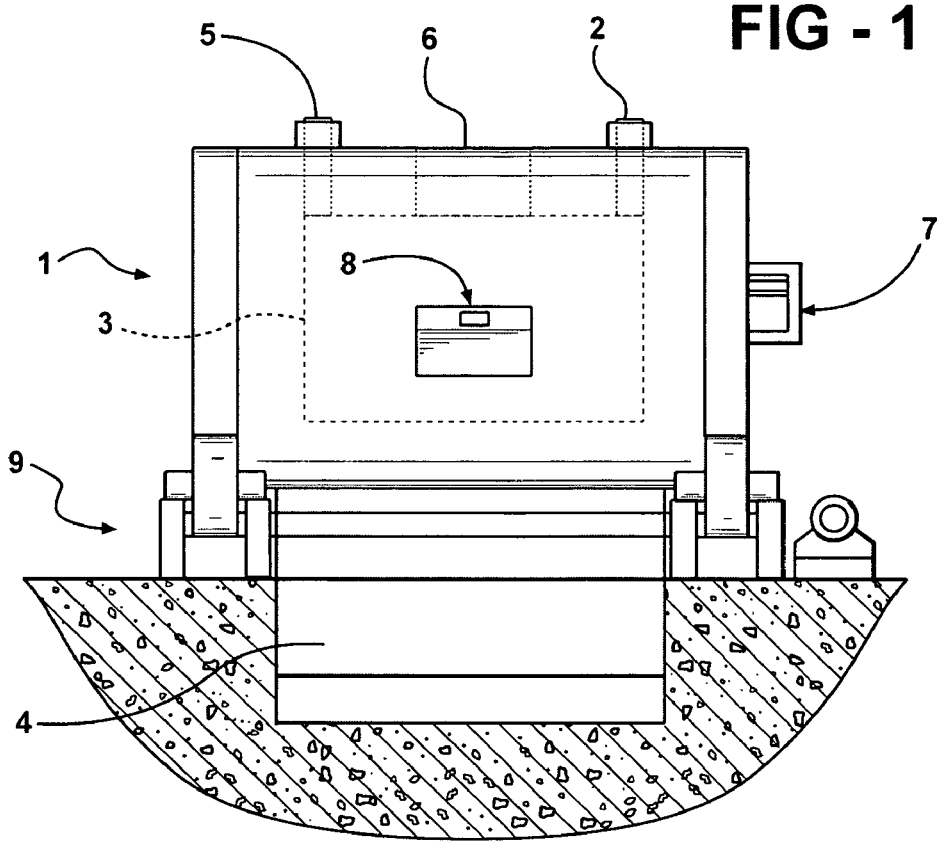
FIG. 1 is a front view of a channel induction furnace used according to one embodiment of the present invention.

The present invention is directed to a method for the production of an iron product from ore containing iron using an induction furnace. The invention allows a mixture of ore and a reductant to be processed continuously to reduce the iron oxide to elemental iron that can be sold directly to iron and steel manufacturing processes. This process would provide a 30 to 40 percent reduction in the weight of material that would be shipped from ore processing facilities and eliminate the need for the construction of capital intensive equipment such as blast furnaces, coke ovens and basic oxygen furnaces.

Generally, the melting of reduced iron in iron ore requires a substantial amount of energy as compared with the melting of conventional scrap iron or steel. Reasons for the increased energy requirements are attributed to the physical properties of the iron ore, for example, its porosity, and its chemical properties such as the presence of gangue impurities. In the past, the high energy requirements have made the melting of iron ore unrealistic and iron ore processing has therefore been limited to various concentrating techniques for use in blast furnaces and smelting processes.

The present invention provides a method in which iron ore is processed in an induction furnace to produce iron products that can be subsequently used at steel mills and foundries to make steel and iron products. In addition, the present invention involves a uniquely configured induction furnace that can be continuously operated for the production of an iron product from iron ore in a manner that is energy efficient and provides improved separation and control of slag that is produced during the processing of the iron ore. The iron ore processed according to the present invention includes raw iron ore that is finely divided or granulated or iron ore that has been concentrated using any conventional process such as magnetic separation, floatation processing, roasting, etc.

The configuration of the induction furnace used according to the present invention allows for: 1) operating the furnace with a high gas temperature in the head space of the furnace by controlling the flow of excess air into the furnace; 2) operating the furnace to allow a minimum quantity of air to combust a portion of the carbon monoxide in the gas head space to provide additional heat in the head space and allow the gas head space to remain in a reducing state; 3) controlling the chemistry of slag formed in the process with additions of agents such as silica (or lime) to product a fluid slag material that can be easily removed from the furnace; 4) providing a feed location at the opposite end of the gas and slag removal locations to allow for a plug flow type reactor that provides an extended reaction time for the process, allowing for more complete separation of the slag and feed materials in the process; and 5) providing a channel type induction furnace that allows a more energy efficient furnace to be used with thicker refractory sections that both reduce the heat loss from the process and allow for longer periods of operation between the replacement of refractory lining material. These characteristics of the induction furnace which were previously developed by the present inventor have been determined to be particularly useful in the processing of iron ore according to the present invention.

According to one embodiment, the apparatus used for the present invention includes a channel type induction furnace that has an inductor at the bottom or at another suitable lower portion of the furnace body. This feature allows the furnace to be designed in a more energy efficient manner by incorporating a thicker layer of refractory in the main body (drum portion) of the furnace. This thicker refractor also provides for longer period of time between the need for refractory replacement. While the use of an induction furnace of this type is not unique per se, the use of such an induction furnace for processing iron ore to produce iron products according to the process of the present invention is unique.

The use of a channel type induction furnace also allows additional improvements to be made in the form of energy efficiency. The body of the furnace is a horizontal drum that can be enclosed to thereby allow the flow of air into the process to be restricted and controlled. The restriction of air flow into the drum limits the quantity of air that is heated in the furnace and removed by the gas control system on the furnace, thus reducing the heat lose to the air that is normal for typical induction furnace operation. When finely divided or granular iron ore is added to an iron melt together with carbonaceous materials, the iron oxide in the ore and the carbon of the carbonaceous materials reacts so that as the iron ore is reduced to iron carbon monoxide is produced. According to the present invention the amount of air that enters the furnace can be controlled to only burn a portion of the carbon monoxide generated by the metal reduction process in the furnace. This burning of the carbon monoxide provides additional heat in the gas head space of the furnace thereby allowing the furnace to operate with a higher temperature in the head spaced than is normal for operation. The high temperature of the gas head space achieved by the process of the present invention, which can range from about 1,300° C. to about 1,500° C., eliminates or greatly reduces heat loss from the surface of the furnace bath and thereby allows the slag on the surface of the bath to be maintained at a higher temperature.

The flow of air into the furnace can also be controlled, as desired, to limit the air to a level at which carbon monoxide formed as a result of the metal oxidation reduction process in the system will not be completely oxidized. By keeping excess carbon monoxide in the gas head space of the furnace, the system will be operated in a reducing mode until the gases exit the furnace. When operating in the reducing mode any volatile metals which might be present in the vapor form will be prevented from being oxidized in the furnace before they are removed. This manner of operating limits oxidized volatile metals from being deposited in the slag leaving the furnace. As a result, a cleaner slag is maintained during the process. Alternatively, the air level can be controlled, as desired, to oxidize any volatile component vapors which can thereafter be removed with the slag.

In addition to being able to maintain a cleaner slag (free from volatile component oxides), the present invention provides for the ability to make a higher quality fluid slag that is easier to remove from the induction furnace process. This is accomplished in three ways. First, as discussed above, the air flow into the furnace can be controlled according to the present invention to produce a higher temperature gas head space. This higher temperature in the gas head space provides heat to the surface of the slag. The higher temperature in the gas head space which is not provided by typical operation of an induction furnace prevents and can actually reverse normal loss of heat from the slag surface thereby, in either event, providing a higher temperature for the slag layer. As a result, the fluidity of the slag is increased as compared to the manner in which an induction furnace is typically operated.

Second, according to the present invention, the chemistry of the slag layer can be adjusted to provide a more fluid slag. This is accomplished by adding silica, lime or some other material or known slagging agent to improve the fluidity and quality of the slag.

Third, the induction furnace used according to the present invention is provided with a feed at one end of the furnace and slag/gas removal at the opposite end. This arrangement provides a reaction zone that provides an increase process retention time. This increase in retention time is provided by plug flow movement of the slag on the surface of the iron bath from the feed point to the slag discharge point. The retention time provides more time for volatile metals to react and leave the slag surface before the slag is removed from the furnace. The removed slag therefore has a lower concentration of volatile metals and the proper chemistry for value as an aggregate for road construction applications.

Figure 2:
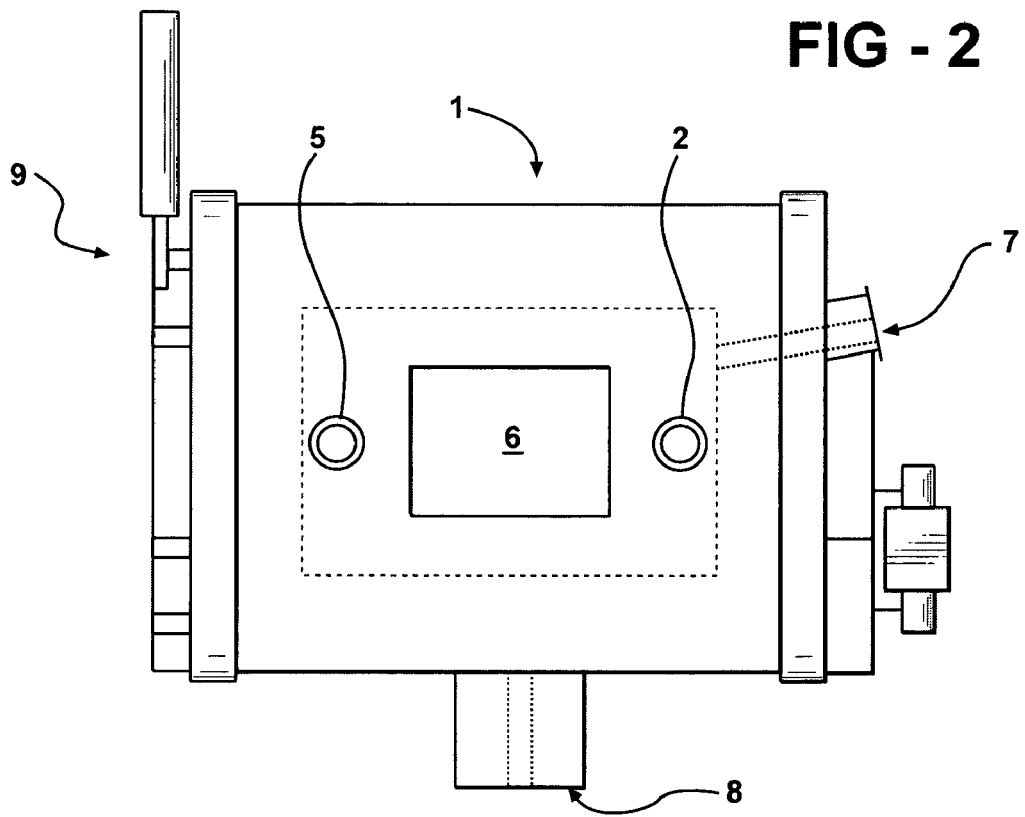
FIG. 2 is a top view of the channel induction furnace of FIG. 1.
Figure 3:
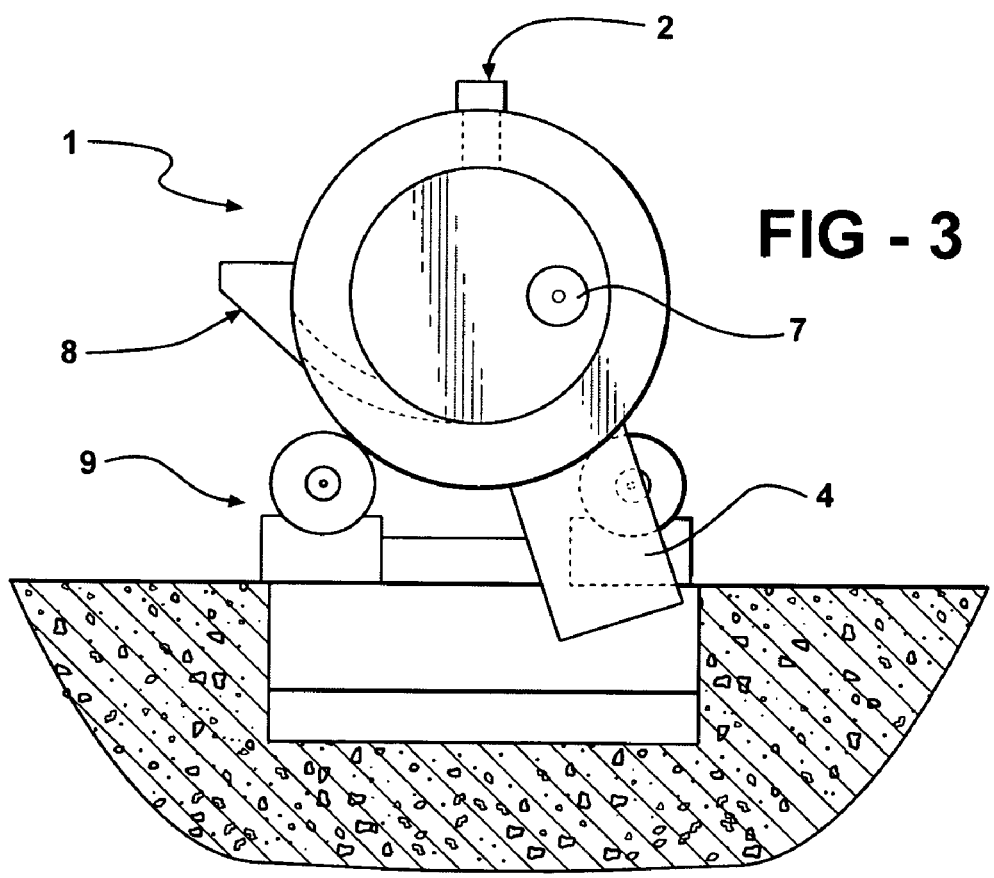
FIG. 3 is a side view of the channel induction furnace of FIG. 1.

FIG. 1 is a front view of a channel induction furnace used according to one embodiment of the present invention. FIG. 2 is a top view of the channel induction furnace of FIG. 1. FIG. 3 is a side view of the channel induction furnace of FIG. 1. The channel induction furnace 1 in FIGS. 1-3 is configured to operate in a continuous or semi-continuous fashion to process a feed of iron ore while producing hot metal or pig iron and slag. In addition, the channel induction furnace 1 is configured to remove slag in a continuous or semi-continuous manner and is further configured to have a gas outlet 2 that can be coupled hood or collector (not shown) for collecting, handling/treating any components in the exit gases in an environmentally conscience manner.

The channel induction furnace 1 generally includes a drum-shaped or cylindrical-shaped chamber 3 that is surrounded and defined by a refractory material that is provided as a liner. The use and installation of such refractory liners in channel induction furnaces is known as are the refractory materials themselves. An inductor 4 of conventional design is provided at a bottom portion of the drum-shaped or cylindrical-shaped chamber 3 and used to form and maintain the molten bath in the channel induction furnace 1.

At the top of the channel induction furnace 1 an inlet 5 for feeding materials into the furnace 1 is provided near one end and an outlet 2 for removal of gases is provided at an opposite end as shown. The channel induction furnace 1 can also be provided with an access port 6 that is generally closed during operation. The access port 6 is shown as being centrally located at the top of the furnace 1.

A slag discharge 7 is provided at one end of the channel induction furnace 1 at a height that is suitable for controlling a slag layer that forms on a molten bath within the furnace 1. The slag discharge 7 comprises a trough or channel structure that extends from the side of the channel induction furnace 1 and is in fluid communication with the drum-shaped or cylindrical-shaped chamber 3. The slag discharge 7 can be provided with a gate or movable darn that can be used to control slag discharge.

The channel induction furnace 1 is also provided with a spout 8 in the front of the furnace 1 through which molten metal from the molten bath can be removed from the drum-shaped or cylindrical-shaped chamber 3. In this regard, the channel induction furnace 1 is provided with a mechanism generally identified by reference number 9 which is used to rotate the drum-shaped or cylindrical-shaped chamber 3 about its central axis in a known manner so that molten metal in the molten bath can flow out through the spout 8.

Figure 4:
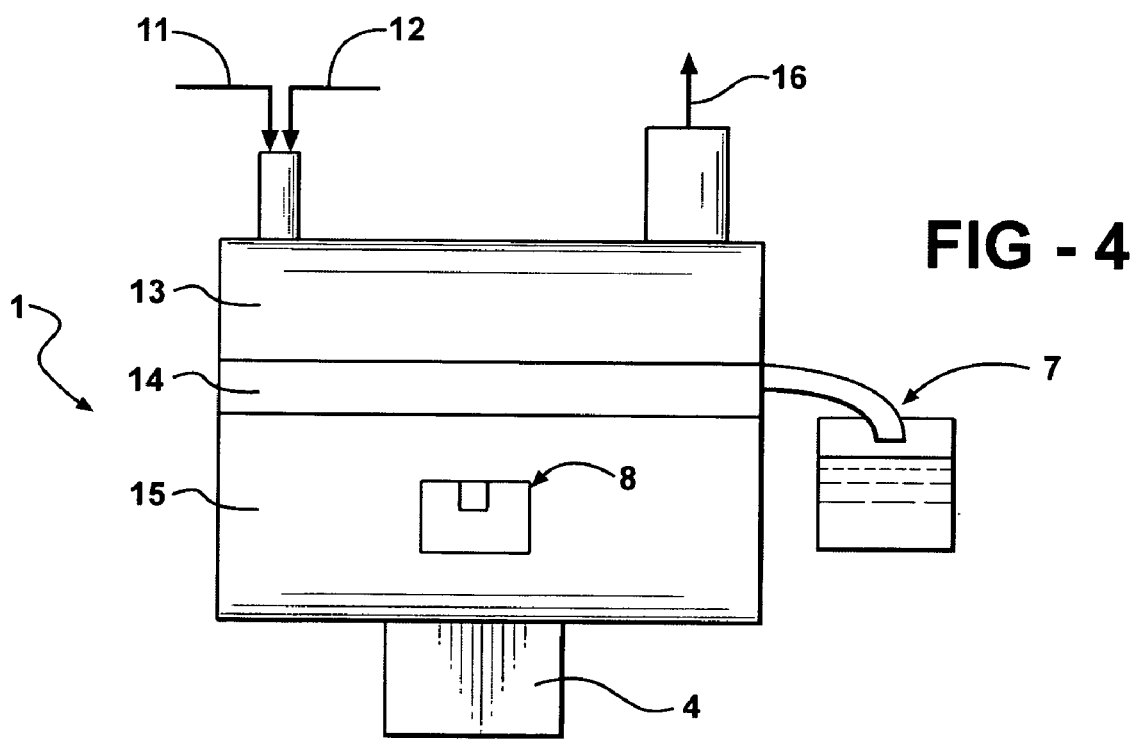
FIG. 4 is a schematic drawing of the channel induction furnace of FIGS. 1-3

FIG. 4 is a schematic drawing of the channel induction furnace of FIGS. 1-3 which is provided to illustrate how the process of the present invention works according to one embodiment. As shown, the inductor 4 is located at the bottom of the induction furnace 1 where it is in communication with the drum-shaped or cylindrical-shaped chamber 3 discussed above. A feed stream 11 that comprises finely divided or granulated iron ore and a carbonaceous reductant material such as coke enters the furnace continuously through inlet 5 provided in the top of the furnace 1 near one end. Slag conditioning material 12 such as silica, lime, etc. can be added to the process through inlet 5 which is at the opposite end of the drum-shaped or cylindrical-shaped chamber 3 than the slag discharge 7. As the feed material enters the furnace through inlet 5 it falls through the gas head space 13 onto the surface of the slag layer 14. The feed material increases in temperature due to the operating temperatures of the furnace and its components react to form iron metal, slag and volatile materials.

Iron, having a high density, passes through the slag layer 14 into the iron liquid metal bath 15 in the bottom portion of the furnace 1. The inductor 4 provides energy for the iron metal bath 15 from electrical power to keep the iron metal bath 15 at a desired operating temperature. The liquid iron from the iron metal bath 15 is removed from the system through a spout 8 at the front of the furnace 1.

Slag, which has a lower density than liquid iron, will float on the surface of the iron metal bath 15 toward the slag discharge 7 at the opposite end of the furnace 1 from the inlet 5. The slag will be kept fluid by a combination of high temperature in the gas head space 13 and slag conditioning additives that improve the slag viscosity as discussed above. The slag can be removed continuously or semi-continuously as desired by the system operation. The travel time from the addition of new feed material to the discharge of its slag components can be adjusted by changing the depth or thickness of the slag layer 14 in the furnace 1 or changing the surface area of the liquid levels in the furnace through equipment design changes.

Gases produced from the process will be a combination of carbon monoxide, carbon dioxide and volatile metal vapors. Some air can be added to the system with the feed material stream 11 and at the slag discharge 7. The oxygen in this added air will burn a portion of the carbon monoxide within the gas head space 13 to add additional heat to the gas head space 13 area. If too much air is added or allowed to enter at these points, all of the carbon monoxide present in the gas head space 13 will be burned followed by the burning or oxidation of a portion of the metal vapors. If the metal vapors are allowed to burn or oxidize they will form metal oxides that can condense in the furnace 1 and into the slag layer 14. This undesired burning or oxidation of metal vapors would result in a lower percentage of volatile metal recovery and an increase in unwanted materials in the slag layer 14.

The present invention according involves operating the system with control of the air entering the furnace in order to provide the proper gas head space 13 operating temperature and limit oxygen entering the gas head space 13. The gas stream 16 exiting the furnace 1 can be reacted with air in a conventional manner as it leaves the furnace 1 to oxidize the volatile metals so that they can be collected in the manner taught by U.S. Pat. No. 6,136,059 to Zoppi and U.S. Pat. No. 6,831,939 to Bratina and Fehsenfeld. In addition, cooling of the exiting gases can be accomplished to condense volatile metal oxides that are to be recovered. Volatile metals that can be recovered include zinc, lead, cadmium and others which may be present as elemental metals, halides or oxides. These collected volatile metal materials can be subsequently processed to recover the volatile metals according to conventional processes.

In operation, the slag layer 14 can be removed and consequently reduced in thickness until the surface of the underlying molten metal layer approaches the height of the slag discharge 7, before which the drum-shaped or cylindrical-shaped chamber 3 can be rotated about its central axis so that the iron product in the molten metal iron bath 15 can flow out through the spout 8.

Figure 5:
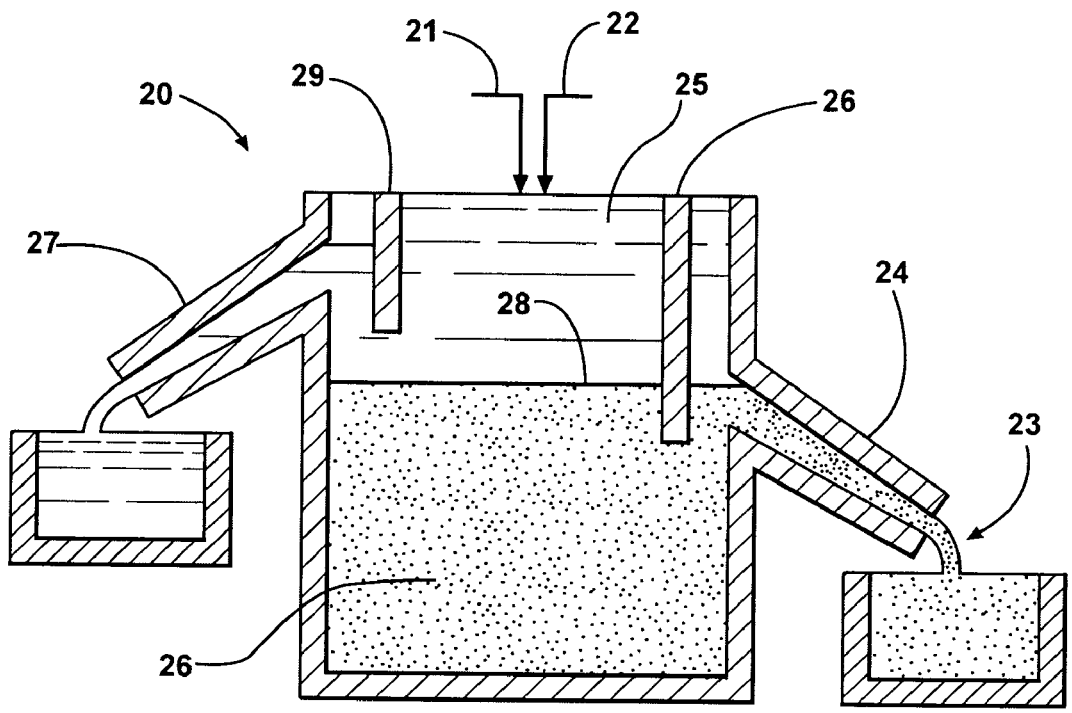
FIG. 5 is cross-sectional side view of an induction furnace that can be used according to another embodiment of the present invention.
Figure 6:
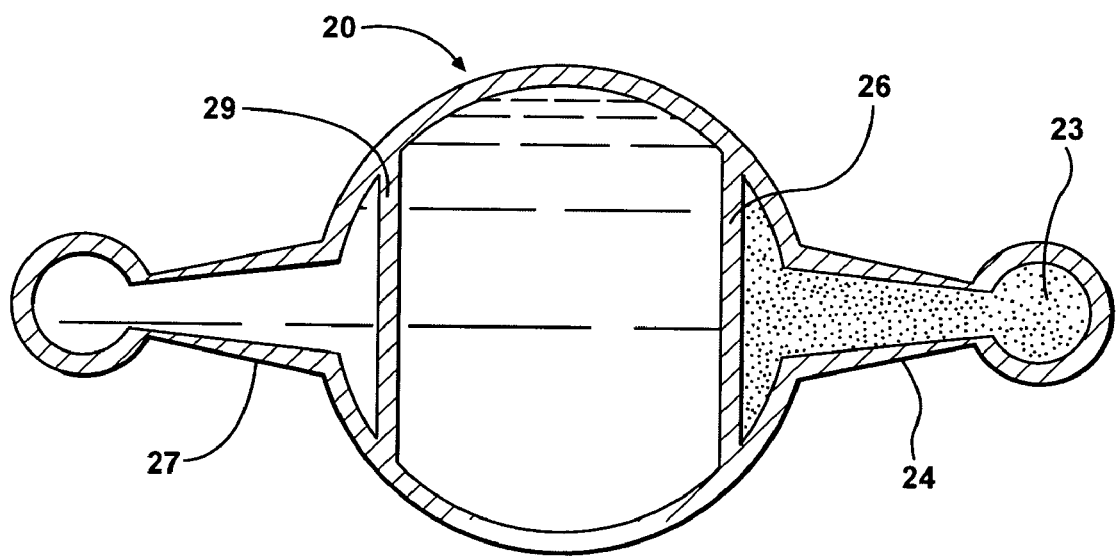
FIG. 6 is a cross-sectional top view of the induction furnace of FIG. 5.

FIG. 5 is cross-sectional side view of an induction furnace that can be used according to another embodiment of the present invention. FIG. 6 is a cross-sectional top view of the induction furnace of FIG. 5.

FIGS. 5 and 6 depict a system according to another embodiment of the present invention that uses an induction furnace 20 that is operated in a continuous manner to process a feed of iron ore while producing a hot metal iron product such as pig iron. The system depicted in FIG. 5 includes an induction furnace 20 that is configured to allow materials to be charged into and removed from the induction furnace 20 in a continuous. As shown in FIG. 5 feed streams of a finely divided or granulated iron ore 21 and a carbonaceous reductant material such as coke 22 are fed into the induction furnace 20. It is to be understood that although two feed streams are depicted, in practice the induction furnace system can have a single inlet for adding feed materials therein. A conventional inductor (not shown) can be coupled to the induction furnace in a suitable position to form and maintain the iron liquid metal bath.

FIG. 5 depicts a product stream 23 which represents hot metal or iron product (e.g., pig iron) being discharged from the induction furnace 20 in a continuous manner through a product spill over outlet 24. During operation of the induction furnace system of FIGS. 5 and 6, iron, which has a high density, passes through the slag layer 25 into the iron liquid metal bath 26 in the bottom portion of the furnace 20. By providing the product spill over outlet 24 at a proper height approximately at or below the level of the iron liquid metal melt bath 26, the system can be operated so that as more iron enters the iron liquid metal bath 26, more of the hot metal or iron product 23 is removed through the product spill over outlet 24. Further control can be achieved by providing the weir 26 shown in FIGS. 5 and 6 at a proper height and a gate or movable dam in the product spill over outlet 24.

The slag layer 25 which floats on the iron liquid metal layer 26 can be removed through a slag spill over outlet 27 which can be provided on an opposite side of the induction furnace 20 from the product spillover outlet 24 and at a height above the slag/iron liquid metal interface 28 which will ensure that only slag 25 is removed through the slag spillover outlet 27 during operation of the induction furnace 20. A weir 29 can be provided to control the level or height of the slag layer 25 which, if thick enough, can apply pressure to the underlying iron liquid metal bath 26.

During the operation of the induction furnace system depicted in FIGS. 5 and 6, chemical slagging agents and/or conventional mechanical slag skimmers can be used to manage the slag layer 25 if desired. Continuous operation can be accomplished by continuously feeding in finely divided or granulated iron ore 21 and a carbonaceous reductant material 22 and removing the hot metal or iron product 23 and slag from the slag layer 25. The process can be continuously operated as described or semi-continuously operated by charging the finely divided or granulated iron ore 21 feed and a carbonaceous reductant material 22 or removing the metal or iron product 23 or slag from the slag layer 25 intermittently. Alternatively, the induction furnace system could be operated as a batch process in which a discrete feed of the finely divided or granulated iron ore 21 and a carbonaceous reductant material 22 are fed into the induction furnace and processed before a second feed is used.

Any volatile metals such as zinc, lead, cadmium, etc. which may be present can either be recovered using a hood or collector (not shown) in conjunction with the induction furnace 20 and collected, handed/treated in an environmentally conscience manner. Alternatively, if the feed into the induction furnace includes only a small amount of volatile metals which does not economically justify recovering the same, an oxidizing atmosphere can be maintained over the slag layer 25 to oxidize such volatile metals and cause them to be removed with the slag layer for subsequent processing.

The product spillover outlet 24 and the slag spillover outlet 27 can be operated like spouts to discharge a metal or iron product 23 and/or slag from the slag layer 25 by tilting the induction furnace 20 from side to side as shown in FIG. 5. Moreover, although the induction furnace 20 depicted in FIGS. 5 and 6 has a cylindrical shape with its central axis positioned vertical, it is also possible for the induction furnace 20 to have other shapes and orientations including a cylindrical shape with its central axis positioned horizontally in which case the optional manner of tilting the induction furnace 20 to discharge a metal or iron product 23 and/or slag from the slag layer 25 could be accomplished by rotating the induction furnace about its central axis.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and as set forth in the attached claims.

What is claimed is:

1. A process for producing an iron containing product from iron ore which comprises:
   providing a channel induction furnace, having opposite ends, a unobstructed interior space between the opposite ends, and an inlet for feeding material into the channel induction furnace at one of the opposite ends and a slag discharge outlet at another one of the opposite ends for removing slag from the channel induction furnace;
   feeding iron ore into the inlet of the channel induction furnace with a reductant material;
   melting the iron ore in the channel induction furnace to produce an iron liquid metal bath and a slag layer on top of the iron liquid metal bath; and
   recovering the iron liquid metal bath as an iron containing product.

2. A process for producing an iron containing product from iron ore according to claim 1, wherein the iron ore fed into the channel induction furnace comprises concentrated iron ore.

3. A process for producing an iron containing product from iron ore according to claim 1, wherein the iron containing product comprises pig iron.

4. A process for producing an iron containing product from iron ore according to claim 1, wherein the iron ore is mined at a site and the step of providing the channel induction furnace comprises providing the channel induction furnace at the same site where the iron ore is mined.

5. A process for producing an iron containing product from iron ore according to claim 2, wherein the iron ore is concentrated at a site and the step of providing the channel induction furnace comprises providing the channel induction furnace at the same site where the iron ore is concentrated.

6. A process for producing an iron containing product from iron ore according to claim 1, wherein the step of feeding iron ore into the channel induction furnace comprises feeding the iron ore into the channel induction furnace in a continuous manner.

7. A process for producing an iron containing product from iron ore according to claim 1, wherein the step of feeding from ore into the channel induction furnace comprises feeding the iron ore into the channel induction furnace in discrete batches.

8. A process for producing an iron containing product from iron ore according to claim 1, further comprising the step of removing at least a portion of the slag layer from on top of the iron liquid metal bath.

9. A process for producing an iron containing product from iron ore which comprises:
  providing a channel induction furnace, having opposite ends, a unobstructed interior space between the opposite ends, and an inlet for feeding material into the channel induction furnace at one of the opposite ends and a slag discharge outlet at another one of the opposite ends for removing slag from the channel induction furnace;
  feeding a single source of iron ore into the inlet of the channel induction furnace with a reductant material to produce an iron containing product, the singe source of iron consisting essentially of iron ore;
  melting the iron ore in the channel induction furnace to produce an iron liquid metal bath and a slag layer on top of the iron liquid metal bath; and
  recovering the iron liquid metal bath as an iron containing product.

10. A process for producing an iron containing product from iron ore according to claim 9, wherein the iron ore fed into the channel induction furnace comprises concentrated iron ore.

11. A process for producing an iron containing product from iron ore according to claim 9, wherein the iron containing product comprises pig iron.

12. A process for producing an iron containing product from iron ore according to claim 9, wherein the iron ore is mined at a site and the step of providing the channel induction furnace comprises providing the channel induction furnace at the same site where the iron ore is mined.

13. A process for producing an iron containing product from iron ore according to claim 11, wherein the iron ore is concentrated at a site and the step of providing the channel induction furnace comprises providing the channel induction furnace at the same site where the iron ore is concentrated.

14. A process for producing an iron containing product from iron ore according to claim 9, wherein the step of feeding the feeding a single source of iron into the channel induction furnace comprises feeding the feeding a single source of iron into the channel induction furnace in a continuous manner.

15. A process for producing an iron containing product from iron ore according to claim 9, wherein the step of feeding the single source of iron into the channel induction furnace comprises feeding the single source of iron into the channel induction furnace in discrete batches.

16. A process for producing an iron containing product from iron ore according to claim 9, further comprising the step of removing at least a portion of the slag layer from on top of the iron liquid metal bath.

17. A process for producing an iron containing product from iron ore which comprises:
  providing a channel induction furnace, having opposite ends, a unobstructed interior space, between the opposite ends, an inlet for feeding material into the channel induction furnace at one of the opposite ends and a slag discharge outlet at another one of the opposite ends for removing slag from the channel induction furnace;
  exclusively feeding iron ore into the inlet of the channel induction furnace with a reductant material;
  melting the iron ore in the channel induction furnace to produce an iron liquid metal bath and a slag layer on top of the iron liquid metal bath; and
  recovering the iron liquid metal bath as an iron containing product.

18. A process for producing an iron containing product exclusively from iron are according to claim 17, wherein the iron ore fed into the channel induction furnace comprises concentrated iron ore.

19. A process for producing an iron containing product exclusively from iron ore according to claim 17, wherein the iron ore is mined at a site and the step of providing the channel induction furnace comprises providing the channel induction furnace at the same site where the iron ore is mined.

20. A process for producing an iron containing product exclusively from iron ore according to claim 18, wherein the iron ore is concentrated at a site and the step of providing the channel induction furnace comprises providing the channel induction furnace at the same site where the iron ore is concentrated.

* * * * *